(12) United States Patent
Winiecki

(10) Patent No.: US 9,299,109 B2
(45) Date of Patent: Mar. 29, 2016

(54) MOTOR VEHICLE MONITORING METHOD FOR DETERMINING DRIVER NEGLIGENCE OF AN ENGINE

(71) Applicant: Kenneth Carl Steffen Winiecki, Cupertino, CA (US)

(72) Inventor: Kenneth Carl Steffen Winiecki, Cupertino, CA (US)

(*) Notice: Subject to any disclaimer, the term of this patent is extended or adjusted under 35 U.S.C. 154(b) by 0 days.

(21) Appl. No.: 14/705,163

(22) Filed: May 6, 2015

(65) Prior Publication Data

US 2016/0019654 A1    Jan. 21, 2016

Related U.S. Application Data

(60) Provisional application No. 62/025,909, filed on Jul. 17, 2014, provisional application No. 62/025,911, filed on Jul. 17, 2014, provisional application No. 62/025,915, filed on Jul. 17, 2014, provisional application No. 62/025,917, filed on Jul. 17, 2014.

(51) Int. Cl.
*G06Q 40/00* (2012.01)
*G06Q 40/08* (2012.01)
(Continued)

(52) U.S. Cl.
CPC ............ *G06Q 40/08* (2013.01); *G06Q 30/0645* (2013.01); *B60W 50/08* (2013.01); *B60W 2510/0604* (2013.01); *B60W 2510/0638* (2013.01); *B60W 2510/0666* (2013.01); *B60W 2520/10* (2013.01); *G07C 5/008* (2013.01); *G07C 5/0808* (2013.01); *G07C 2205/02* (2013.01)

(58) Field of Classification Search
CPC .. G07C 5/008; G07C 2205/02; G07C 5/0808; B60W 2510/0604; B60W 2510/0638; B60W 2510/0666; B60W 2520/10; B60W 50/08

USPC ......... 705/4; 701/29.1, 29.4, 29.8, 33.2, 33.3, 701/33.9, 34.4
See application file for complete search history.

(56) References Cited

U.S. PATENT DOCUMENTS 3,903,736 A * 9/1975 Bissett .................... F02P 17/00
                                                                340/309.7
5,569,848 A * 10/1996 Sharp .................... B60C 23/061
                                                                324/160
(Continued)

FOREIGN PATENT DOCUMENTS

JP          EP 0092484 A1 * 10/1983  ................ G01P 1/10

OTHER PUBLICATIONS

O'Connor, I. D., Caspe-Detzer, M., Scherzinger, T. J., Creel, W. M., & Winch, W. M. (0910). Securely calculating and storing vehicle odometer data Retrieved from http://search.proquest.com/docview/34919618?accountid=14753 retrieved on Nov. 13, 2015.*

*Primary Examiner* — Kito R Robinson

(57) ABSTRACT

A motor vehicle monitoring method for determining driver negligence is carried out by a company in order to determine a final assessment for the vehicle. The present invention enables the company to calculate an average revolutions per initial odometer value and an average revolutions per secondary odometer value, where the average revolutions per secondary odometer value is a direct indication about operating state of the vehicle or an action of an end user during a designated time period. Then the company is able to adjust the contact agreement for the designated time period upon the final assessment, wherein the responsible party that violates the contact agreement is only liable for the respective damages.

13 Claims, 7 Drawing Sheets

(51) Int. Cl.
  *G06Q 30/06* (2012.01)
  *G07C 5/00* (2006.01)
  *B60W 50/08* (2012.01)
  *G07C 5/08* (2006.01)

(56) References Cited

U.S. PATENT DOCUMENTS

| | | | | |
|---|---|---|---|---|
| 7,092,803 B2 * | 8/2006 | Kapolka | ............... | G07C 5/008 340/3.1 |
| 7,449,995 B1 * | 11/2008 | Clanton-Holloway | | G07C 5/006 340/438 |
| 7,610,128 B2 * | 10/2009 | O'Connor | ............... | G07C 5/085 235/95 R |
| 9,008,947 B1 * | 4/2015 | Winiecki | ............... | G01M 15/04 701/102 |
| 9,053,469 B1 * | 6/2015 | Bohanek | ............... | G06Q 20/085 |
| 2002/0072963 A1 * | 6/2002 | Jonge | ............... | G07B 15/02 705/13 |
| 2004/0167689 A1 * | 8/2004 | Bromley | ............... | G07C 5/0808 701/29.6 |
| 2005/0092290 A1 * | 5/2005 | Gudgeon | ............... | F02P 11/02 123/335 |
| 2006/0122854 A1 * | 6/2006 | Campello | ............... | G06Q 10/087 710/15 |
| 2006/0190149 A1 * | 8/2006 | LaPant | ............... | B60K 15/06 702/182 |
| 2010/0085193 A1 * | 4/2010 | Boss | ............... | H04N 5/76 340/573.1 |
| 2010/0087984 A1 * | 4/2010 | Joseph | ............... | G09B 19/16 701/31.4 |
| 2011/0077816 A1 * | 3/2011 | Biondo | ............... | G07C 5/008 701/31.4 |
| 2011/0125363 A1 * | 5/2011 | Blumer | ............... | G06Q 30/06 701/31.4 |
| 2012/0150758 A1 * | 6/2012 | Belady | ............... | G06Q 30/018 705/317 |
| 2014/0005917 A1 * | 1/2014 | Leggett | ............... | B60R 16/0236 701/123 |
| 2014/0116031 A1 * | 5/2014 | Yoshida | ............... | E02F 9/2066 60/276 |

* cited by examiner

MOTOR VEHICLE MONITORING METHOD FOR DETERMINING DRIVER NEGLIGENCE OF AN ENGINE

The current application claims a priority to the U.S. Provisional Patent application Ser. No. 62/025,909 filed on Jul. 17, 2014, the U.S. Provisional Patent application Ser. No. 62/025,911 filed on Jul. 17, 2014, the U.S. Provisional Patent application Ser. No. 62/025,915 filed on Jul. 17, 2014 and the U.S. Provisional Patent application Ser. No. 62/025,917 filed on Jul. 17, 2014.

FIELD OF THE INVENTION

The present invention relates generally to the field of automotive systems. More specifically, the present invention is a method of determining a driver's negligence during the break-in period of a new engine, a lease agreement, a rental agreement, and an insurance premium calculation based upon monitoring, recording and communicating data representative of operator and vehicle driving characteristics.

BACKGROUND OF THE INVENTION

Most vehicle related companies such as rental companies, car dealerships, and insurance companies utilize the total mileage of a vehicle so that each of these companies are able to determine their respective contacts based upon the total millage and other related variables. Although different variables are utilized by these companies, the total mileage of the vehicles is considered to be the most important aspect as the total mileage is directly related to the mechanical condition of the engine and the other components of the drivetrain. However, the relationship between the total mileage and the condition of the engine can be misleading in some instances. For example, some older high mileage cars may have engines that have been well maintained and revved with low engine revolutions while some older low mileage cars may have engines that have been abused and revved with high engine revolutions. Normally a buyer would purchase the lower mileage car assuming it has the better engine compared to the high mileage car. In relation to the example, the lower mileage car has the worse conditioned engine compared to the engine of the higher mileage car. This provides a real challenge for used car buyers because they cannot find out the how the engine of a particular used car is cared for by the previous owner. The rental companies, car dealerships, and insurance companies are also faced with this problem as they would only consider the total mileage and not the total number of engine revolutions along with the total mileage.

The present invention takes into consideration the number of total revolutions of the engine and the total distance traveled by the vehicle or the total runtime of the engine so that the average revolutions per distance unit can be calculated. Resulting data of the present invention can be displayed within the control panel of the vehicle as the resulting data provides valuable information not only for car buyers but also for car dealers, car rental companies, insurance companies, and many other similar vehicle related entities. More specifically, the present invention is a method of determining a driver's negligence during the break-in period of a new engine based upon monitoring, recording and communicating data representative of operator and vehicle driving characteristics. The resulting data is reflective upon the drivers willingness to not abide by new engine break in procedures is adjustable retrospectively and can be prospectively set by relating the break in driving characteristics to predetermined safety standards. The present invention also determines a vehicle lease surcharge, a vehicle rental surcharge, and an insurance premium calculation based upon monitoring, recording and communicating data representative of operator and vehicle driving characteristics.

DETAIL DESCRIPTIONS OF THE INVENTION

All illustrations of the drawings are for the purpose of describing selected versions of the present invention and are not intended to limit the scope of the present invention.

The present invention is a motor vehicle monitoring method for determining driver negligence of an engine. The present invention collects raw data elements in regards to engine revolutions and the distance traveled, which are representative of an operating state of the vehicle or an action of the operator of the vehicle. The total distance traveled by a vehicle and an average revolutions per distance unit (ARDU) valve for the total distance traveled, which are utilized within the calculations of the present invention, are respectively shown through an odometer and an average revolution meter of the vehicle. More specifically, the ARDU valve is calculated by an engine control unit (ECU) of the vehicle as a plurality of engine revolutions of the engine is divided by the total distance traveled by the vehicle.

The steps of the present invention are implemented on a vehicle by a company so that the company is able to determine a final assessment for the vehicle through the present invention. In reference to FIG. 1, the present invention requires an initial odometer value and an average revolutions per initial odometer value for the vehicle so that the company can start implementing the present invention. More specifically, the initial odometer value is displayed within the odometer as the initial odometer value represents the total distance traveled by the vehicle up to that instant. The average revolutions per initial odometer value is displayed within the average revolution meter of the vehicle as the average revolutions per initial odometer value is calculated through the division of a plurality of initial engine revolutions by the initial odometer value. In other words, the plurality of initial engine revolutions of the present invention represents the plurality of engine revolutions of the vehicle up to that instant.

Figure 1:
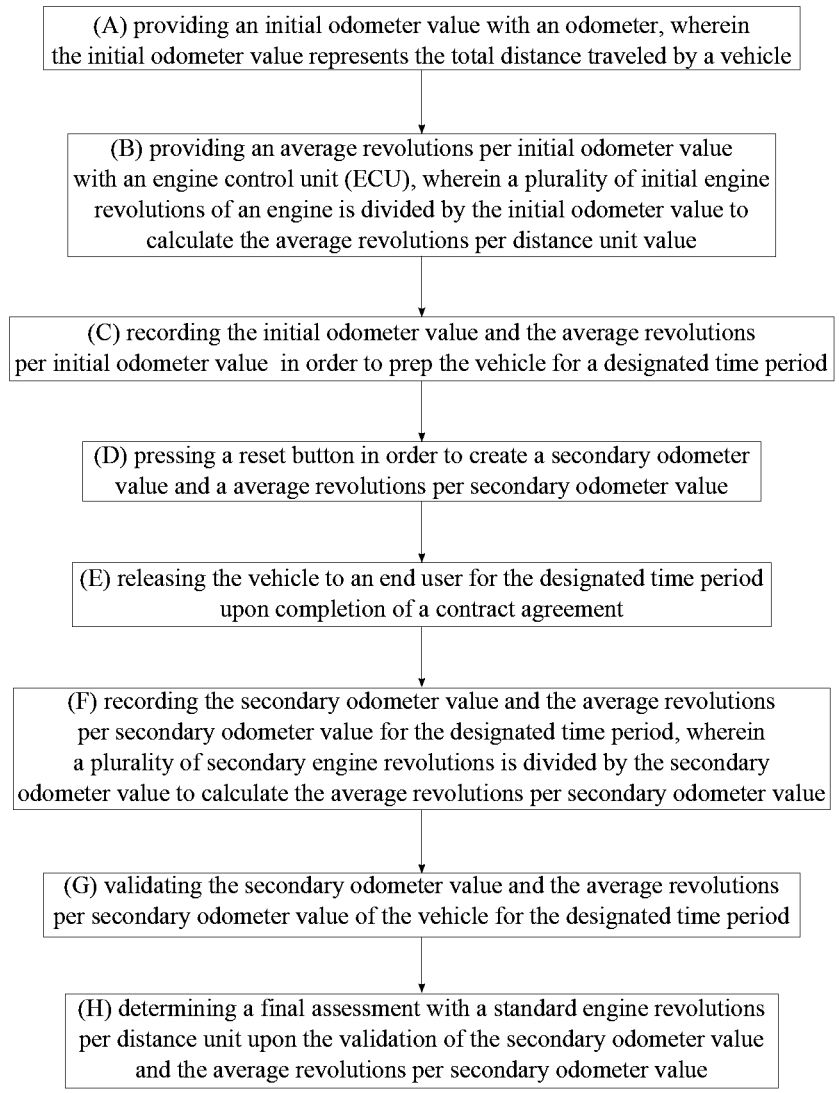
FIG. 1 is a flow chart illustrating the overall method of the present invention.

In reference to FIG. 1, the initial odometer value and the average revolutions per initial odometer value are then recorded by the company so that the vehicle can be prepped for a designated time period. The designated time period of the present invention is a time frame that is allocated for the vehicle by the company, where the time frame is either pre-determined by the company or determined upon a mutual agreement between the company and an end user. For example, a three year car lease, a five year engine warranty, one week car rental agreement, and a six month insurance premium can be seen as the designated time period within the present invention. The designated time period also represents the total time period that the company plans to implement the present invention as the end user of the present invention is also liable to the present invention through the vehicle.

In reference to FIG. 1, a reset button is pressed to create a secondary odometer value and an average revolutions per secondary odometer value for the present invention. Even though the reset button create a temporally starting point for the secondary odometer value and the average revolutions per secondary odometer value within the odometer and the average revolution meter of the vehicle, the ECU separately records the total distance traveled and the ARDU value of the vehicle. Then the vehicle is either released into the custody of the end user for the designated time period or monitored throughout the designated time period upon completion of a contract agreement.

Once the end user returns the vehicle after the designated time period, the secondary odometer value and the average revolutions per secondary odometer value for the designated time period are recorded in order to continuously implement the present invention. The secondary odometer value that represents the total distance traveled within the designated time period is displayed within a trip meter of the odometer as the reset button creates the temporally starting point for the secondary odometer value. The average revolutions per secondary odometer value is also displayed within the average revolution meter of the vehicle as the reset button creates the temporally starting point for average revolutions per secondary odometer value. The average revolutions per secondary odometer value is calculated by the ECU through the division of a plurality of secondary engine revolutions by the secondary odometer value, where the total engine revolutions since the activation of the reset button represents the plurality of secondary engine revolutions.

Figure 3:
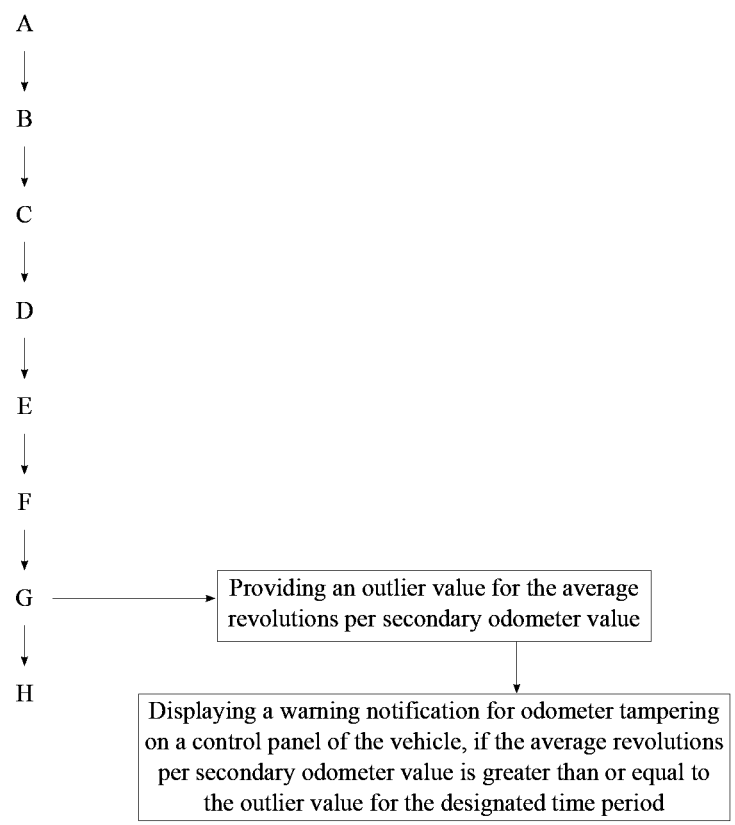
FIG. 3 is a flow chart illustrating the warning notification detections within the overall method of the present invention.

In reference to FIG. 3, the secondary odometer value and the average revolutions per secondary odometer value of the vehicle are validated for the designated time period. More specifically, a control panel of the vehicle is checked for a warning notification for odometer tampering as the warning notification indicates any kind of potential odometer irregularities. An outlier value for the average revolutions per secondary odometer value is stored within the ECU of the vehicle so that the ECU is able to detect abnormal behavior of the average revolutions per secondary odometer value with respect to the secondary odometer value. The outlier value is preset slightly higher than the maximum allowable ARDU valve of the engine, where the outlier value functions as a threshold value to detect any odometer tampering of the vehicle. If the average revolutions per secondary odometer value of the vehicle is greater than or equal to the outlier value within the designated time period, the ECU determines that the odometer of the vehicle is compromised. Then the warning notification for the odometer tampering is displayed on the control panel, wherein the warning notification only provides a visual notification. For example, if the ECU detects that the plurality of secondary engine revolutions has occurred and the secondary odometer value has not been changed in relation to the outlier value for the designated time period, the warning notification is displayed with the control panel. The ECU applies the same process in order to validate the proper functionality of the odometer if the average revolutions per secondary odometer value of the vehicle is less than the outlier value. Once the warning notification is displayed with the control panel, the ECU records an entity for the warning notification in order to keep track of the total number of displayed warning notifications for the vehicle. For example, if an engine has displayed twenty warning notifications, the ECU records twenty different entities for each of the warning notifications.

Figure 2:
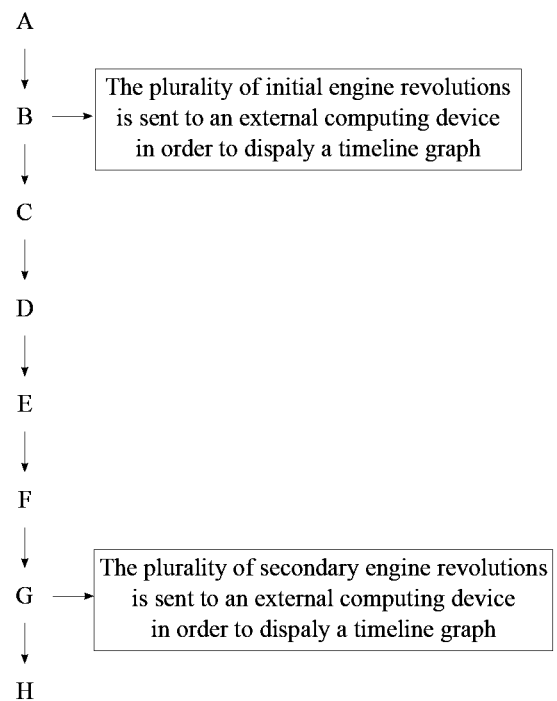
FIG. 2 is a flow chart illustrating visual display of the initial engine revolutions and the secondary engine revolutions within the overall method of the present invention.

In reference to FIG. 2, the ECU can also send the plurality of initial engine revolutions and the plurality of secondary engine revolutions into an external computing device with a communication mean including, but is not limited to, an on-board diagnostic (OBD) connector, a universal serial bus (USB), a local area wireless technology, cellular network, and a wireless technology standard for exchanging data over short distances. More specifically, the plurality of initial engine revolutions and the plurality of secondary engine revolutions can be exported into the external computing device so that the plurality of initial engine revolutions and the plurality of secondary engine revolutions are able to graphically display on a timeline graph. As a result, the company is able to access the data regarding how the engine is revved by the end user of the vehicle in order to properly diagnose the condition of the engine and the driving style of the end user. The timeline graph also displays the total number of warning notification and the total number of activation for the reset button. This allows the company to visually identify any kind of unnecessary activities that may have been conducted during the designated time period.

After validating the secondary odometer value and the average revolutions per secondary odometer value, the final assessment can be determined with a standard engine revolutions per distance unit as the final step of the present invention. The standard engine revolutions per distance unit provides a guideline for the average revolutions per secondary odometer value so that necessary changes can be implemented to the contract agreement. The changes that can be made to the contract agreement upon the average revolutions per secondary odometer value are pre-stated and explained to the end user before the completion of the contract agreement. Then the company is able to adjust the contact agreement upon the final assessment, wherein the responsible party that violates the contact agreement is only liable for the respective damages.

Figure 4:
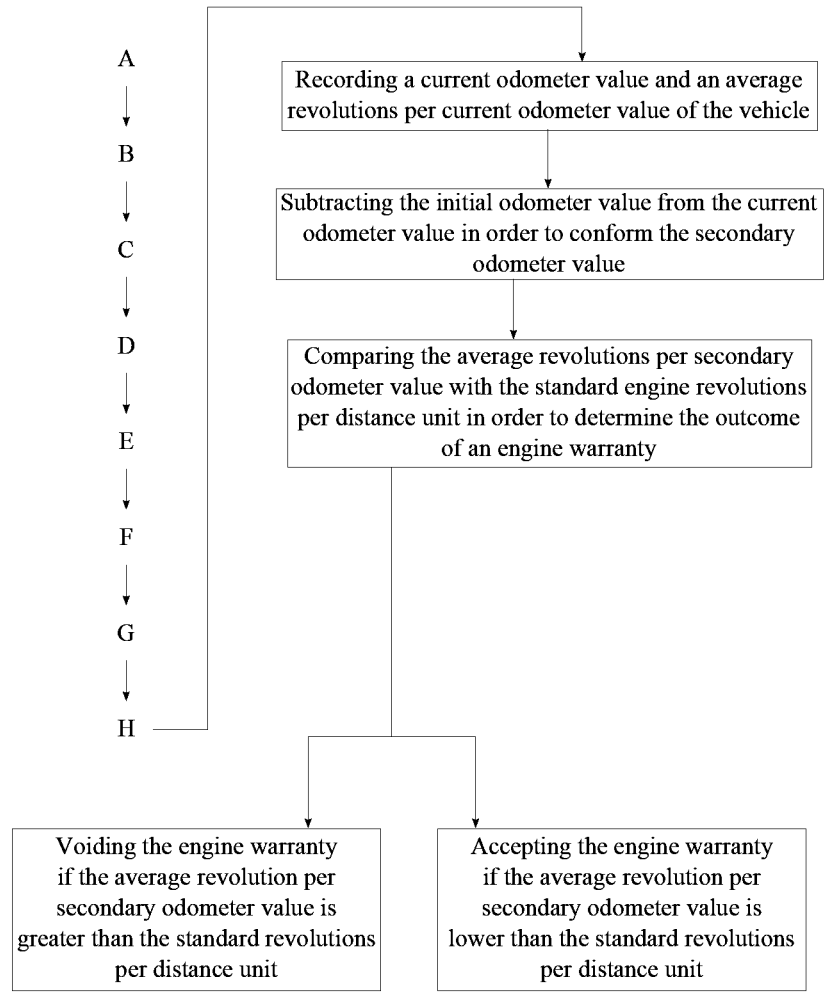
FIG. 4 is a flow chart illustrating the overall method of the present invention, wherein the present invention is implemented to determine the outcome of the engine warranty.

In reference to FIG. 4, the present invention can be implemented by the car dealership in order to properly conclude the outcome of an engine warranty, where the engine warranty becomes the contract agreement for the vehicle. More specifically, after validating the secondary odometer value and the average revolutions per secondary odometer value, a current odometer value and an average revolutions per current odometer value of the vehicle are recorded by the company. Then the initial odometer value is subtracted from the current odometer value in order to conform the secondary odometer value. The average revolutions per secondary odometer value is then compared with the standard engine revolutions per distance unit in order to determine the outcome of the engine warranty in the event of an engine failure during the break in period of the engine. For example, if the average revolutions per secondary odometer value is greater than the standard engine revolutions per distance unit, the car dealership can conclude that the engine failure during the break in period occurs due to the operating state of the vehicle and the negligent actions of the end user. As a result, the car dealership can void the engine warranty as the final assessment. However, if the average revolutions per secondary odometer value is lower than the standard engine revolutions per distance unit, the car dealership can conclude that the engine failure during the break in period occurs due to a defected engine. As a result, the car dealership accepts the engine warranty as the final assessment.

Figure 5:
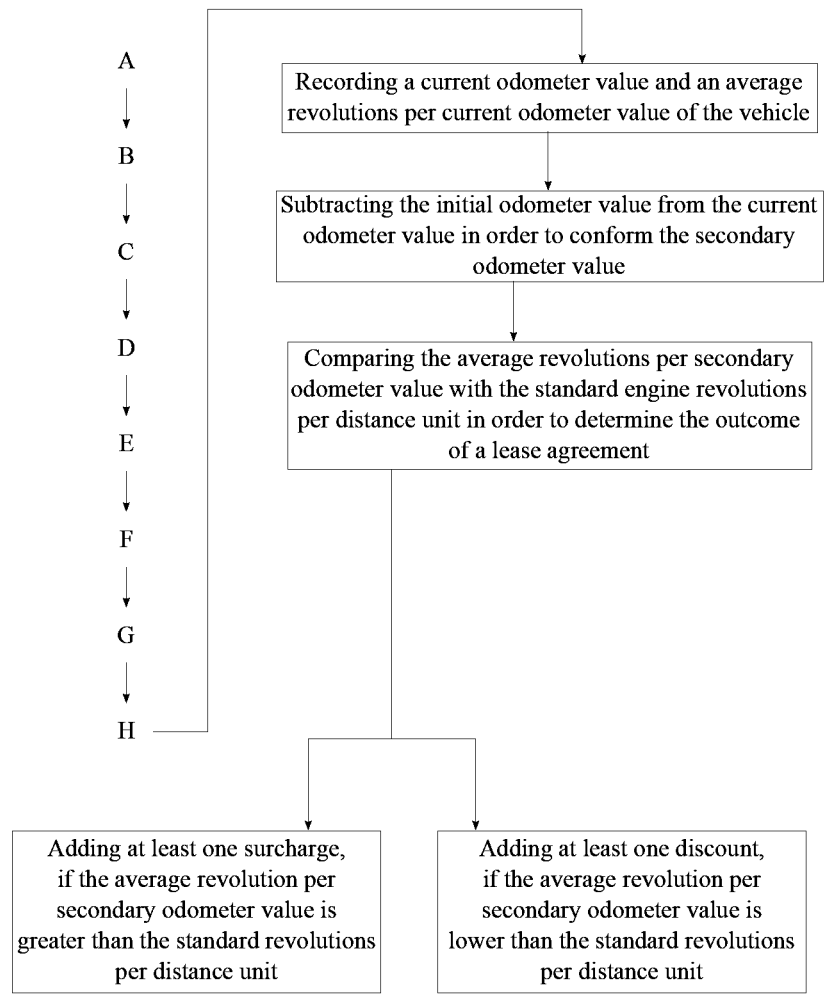
FIG. 5 is a flow chart illustrating the overall method of the present invention, wherein the present invention is implemented to determine the outcome of the lease agreement.

In reference to FIG. 5, the present invention can be implemented by the car dealership in order to properly conclude the outcome of a lease agreement, where the lease agreement becomes the contract agreement for the vehicle. More specifically, after validating the secondary odometer value and the average revolutions per secondary odometer value, a current odometer value and an average revolutions per current odometer value of the vehicle are recorded by the company. Then the initial odometer value is subtracted from the current odometer value in order to conform the secondary odometer value. The average revolutions per secondary odometer value is then compared with the standard engine revolutions per distance unit in order to determine the outcome of the lease agreement after the vehicle has been returned. For example, if the average revolutions per secondary odometer value is greater than the standard engine revolutions per distance unit, the car dealership can conclude that at least one surcharge should be added due to the operating state of the vehicle and the negligent actions of the end user. As a result, the car dealership adds the at least one surcharge to the lease agreement as the final assessment. However, if the average revolutions per secondary odometer value is lower than the standard engine revolutions per distance unit, the car dealership can conclude that at least one discount should be added due to compliance of the end user. As a result, the car dealership adds the at least one discount to the lease agreement as the final assessment.

Figure 6:
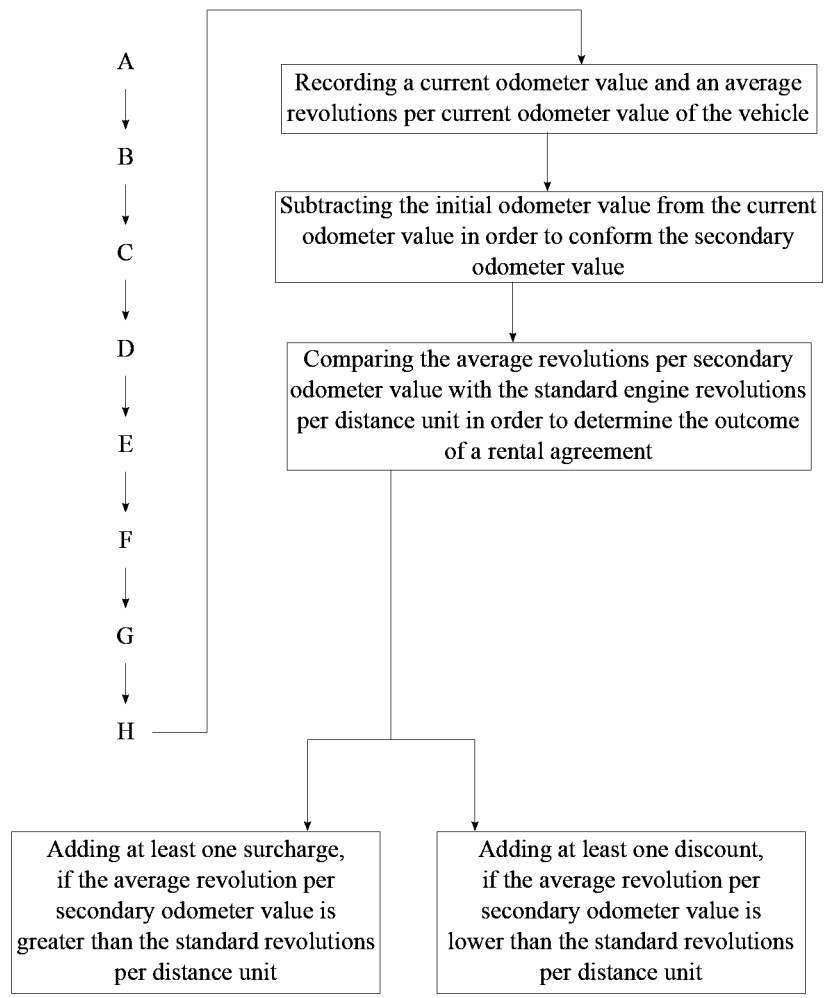
FIG. 6 is a flow chart illustrating the overall method of the present invention, wherein the present invention is implemented to determine the outcome of the rental agreement.

In reference to FIG. 6, the present invention can be implemented by the car rental companies in order to properly conclude the outcome of a rental agreement, where the rental agreement becomes the contract agreement for the vehicle. More specifically, after validating the secondary odometer value and the average revolutions per secondary odometer value, a current odometer value and an average revolutions per current odometer value of the vehicle are recorded by the company. Then the initial odometer value is subtracted from the current odometer value in order to conform the secondary odometer value. The average revolutions per secondary odometer value is then compared with the standard engine revolutions per distance unit in order to determine the outcome of the rental agreement after the vehicle has been returned. For example, if the average revolutions per secondary odometer value is greater than the standard engine revolutions per distance unit, the car rental company may conclude that at least one surcharge should be added due to the operating state of the vehicle and the negligent actions of the end user. As a result, the car rental company adds the at least one surcharge to the rental agreement as the final assessment. However, if the average revolutions per secondary odometer value is lower than the standard engine revolutions per distance unit, the car rental company may conclude that at least one discount should be added due to compliance of the end user. As a result, the car rental company adds the at least one discount to the rental agreement as the final assessment.

Figure 7:
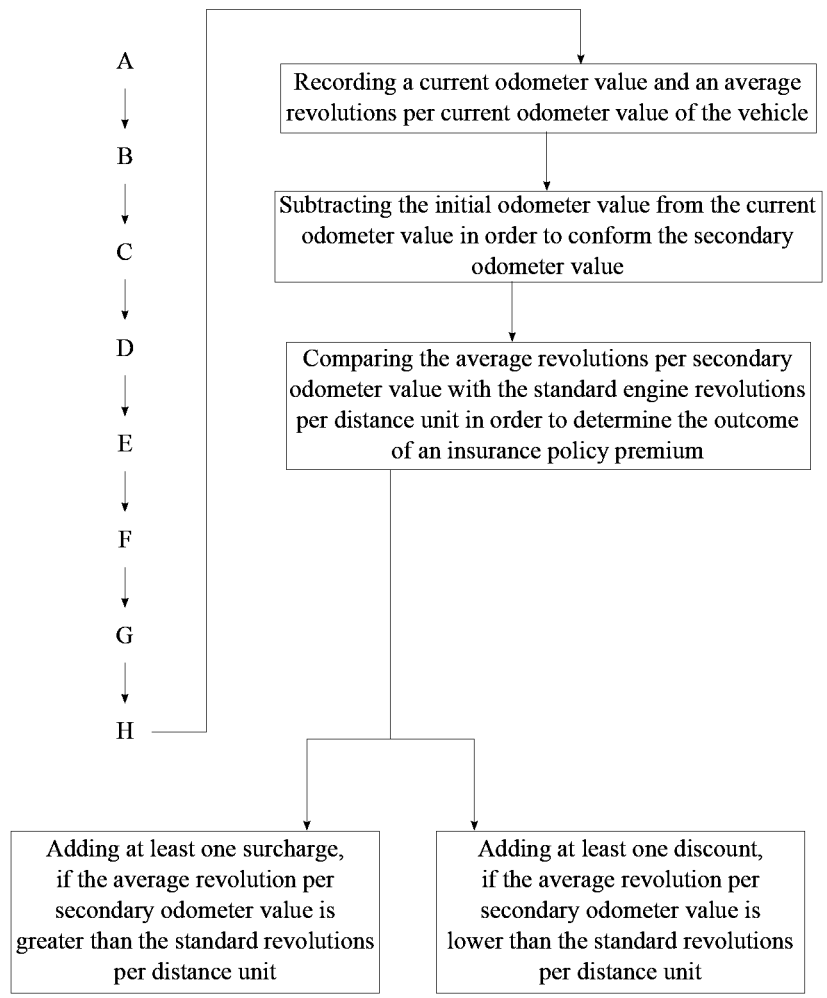
FIG. 7 is a flow chart illustrating the overall method of the present invention, wherein the present invention is implemented to determine the outcome of the insurance policy premium.

In reference to FIG. 7, the present invention can be implemented by the insurance companies in order to properly conclude the outcome of an insurance premium policy, where the insurance policy premium becomes the contract agreement for the vehicle. More specifically, after validating the secondary odometer value and the average revolutions per secondary odometer value, a current odometer value and an average revolutions per current odometer value of the vehicle are recorded by the company. Then the initial odometer value is subtracted from the current odometer value in order to conform the secondary odometer value. The average revolutions per secondary odometer value is then compared with the standard engine revolutions per distance unit in order to determine the outcome of the insurance policy premium. For example, if the average revolutions per secondary odometer value is greater than the standard engine revolutions per distance unit, the insurance company can conclude that at least one surcharge should be added due to the operating state of the vehicle and the negligent actions of the end user. As a result, the insurance company adds the at least one surcharge to the insurance policy premium as the final assessment. However, if the average revolutions per secondary odometer value is lower than the standard engine revolutions per distance unit, the insurance company can conclude that at least one discount should be added due to compliance of the end user. As a result, the insurance company adds the at least one discount to the insurance policy premium as the final assessment.

Although the invention has been explained in relation to its preferred embodiment, it is to be understood that many other possible modifications and variations can be made without departing from the spirit and scope of the invention as hereinafter claimed.

What is claimed is:

1. A method of monitoring a vehicle for determining driver negligence, comprising:
   (A) providing an odometer in a vehicle, the odometer generating representing a total distance traveled by a vehicle
   (B) providing an engine control unit (ECU) and optionally a device connected to the ECU in the vehicle, the engine control unit generating an average revolutions per initial odometer value by repeatedly dividing a plurality of initial engine revolutions occurring a given time period by the initial odometer value;
   (C) recording the initial odometer value and the average revolutions per initial odometer value for determining a designated time period;
   (D) pressing a reset button linked to the odometer and the a total engine revolution counter, when the reset button is pressed, an average revolutions per secondary odometer value is generated by dividing a secondary odometer value by a secondary total engine revolution count value;
   (E) releasing the vehicle to an end user for a length of time equal to the designated time period upon completion of a contract agreement;
   (F) recording the secondary odometer value and the average revolutions per secondary odometer value for the designated time period;
   (G) validating the secondary odometer value and the average revolutions per secondary odometer value of the vehicle for the designated time period, the validating comprising: checking a control panel for a warning notification for odometer tampering, the warning notification indicating potential odometer irregularities; storing an outlier value for the average revolutions per secondary odometer value within the ECU of the vehicle, the ECU detecting abnormal behavior of the average revolutions per secondary odometer value with respect to the secondary odometer value; the outlier value being slightly higher than the maximum allowable average revolution per distance unit ARDU valve of the engine, where the outlier value is a threshold value to detect any odometer tampering of the vehicle; if the average revolutions per secondary odometer value of the vehicle is greater than or equal to the outlier value within the designated time period, the ECU sends a warning signal to the control panel, causing the control panel to display a warning notification for odometer tampering, wherein the warning notification is only a visual notification;

the ECU sending the plurality of initial engine revolutions and the plurality of secondary engine revolutions into an external computing device with a communication mean comprising an on-board diagnostic (OBD) connector, a universal serial bus (USB), a local area wireless technology, cellular network, or another wireless technology;

the communication means exporting the plurality of initial engine revolutions and the plurality of secondary engine revolutions into the external computing device at regular intervals, the external communication means graphically displaying the plurality of secondary engine revolutions in a timeline graph, the timeline graph displaying a total number of warning notification and a total number of activation for the reset button for identifying unnecessary activities that may have been conducted during the designated time period; and (H) determining a final assessment with a standard engine revolutions per distance unit upon the validation of the secondary odometer value and the average revolutions per secondary odometer value.

2. The method as claimed in claim 1 comprises the steps of:
recording a current odometer value and an average revolutions per current odometer value of the vehicle;
subtracting the initial odometer value from the current odometer value in order to conform the secondary odometer value; and
comparing the average revolutions per secondary odometer value with the standard engine revolutions per distance unit in order to determine the outcome of an engine warranty.

3. The method as claimed in claim 2 comprises, wherein the engine warranty of the engine is voided as the final assessment, if the average revolutions per secondary odometer value is greater than the standard engine revolutions per distance unit.

4. The method as claimed in claim 2 comprises, wherein the engine warranty of the engine is accepted as the final assessment, if the average revolutions per secondary odometer value is lower than the standard engine revolutions per distance unit.

5. The method as claimed in claim 1 comprises the steps of:
recording a current odometer value and an average revolutions per current odometer value of the vehicle;
subtracting the initial odometer value from the current odometer value in order to conform the secondary odometer value; and
comparing the average revolutions per secondary odometer value with the standard engine revolutions per distance unit in order to determine the outcome of a lease agreement.

6. The method as claimed in claim 5 comprises, wherein at least one surcharge is added to the lease agreement as the final assessment, if the average revolutions per secondary odometer value is greater than the standard engine revolutions per distance unit.

7. The method as claimed in claim 5 comprises, wherein at least one discount is added to the lease agreement as the final assessment, if the average revolutions per secondary odometer value is lower than the standard engine revolutions per distance unit.

8. The method as claimed in claim 1 comprises the steps of:
recording a current odometer value and an average revolutions per current odometer value of the vehicle;
subtracting the initial odometer value from the current odometer value in order to conform the secondary odometer value; and
comparing the average revolutions per secondary odometer value with the standard engine revolutions per distance unit in order to determine the outcome of a rental agreement.

9. The method as claimed in claim 8 comprises, wherein at least one surcharge is added to the car rental agreement as the final assessment, if the average revolutions per secondary odometer value is greater than the standard engine revolutions per distance unit.

10. The method as claimed in claim 8 comprises, wherein at least one discount is added to the car rental agreement as the final assessment, if the average revolutions per secondary odometer value is lower than the standard engine revolutions per distance unit.

11. The method as claimed in claim 1 comprises the steps of:
recording a current odometer value and an average revolutions per current odometer value of the vehicle;
subtracting the initial odometer value from the current odometer value in order to conform the secondary odometer value; and
comparing the average revolutions per secondary odometer value with the standard engine revolutions per distance unit in order to determine the outcome of an insurance policy premium.

12. The method as claimed in claim 11 comprises, wherein at least one surcharge is added to the insurance policy premium as the final assessment, if the average revolutions per secondary odometer value is greater than the standard engine revolutions per distance unit.

13. The method as claimed in claim 11 comprises, wherein at least one discount is added to the insurance policy premium as the final assessment, if the average revolutions per secondary odometer value is lower than the standard engine revolutions per distance unit.

* * * * *